United States Patent
Miller et al.

(10) Patent No.: US 8,240,616 B2
(45) Date of Patent: Aug. 14, 2012

(54) METHOD AND SYSTEM FOR GLOBAL FLOW FIELD MANAGEMENT USING DISTRIBUTED, SURFACE-EMBEDDED, NANO-SCALE BOUNDARY LAYER ACTUATION

(76) Inventors: Daniel N. Miller, Bainbridge Island, WA (US); Brent N. McCallum, Fort Worth, TX (US); Stewart A. Jenkins, Keller, TX (US); David M. Wells, Fort Worth, TX (US)

(*) Notice: Subject to any disclaimer, the term of this patent is extended or adjusted under 35 U.S.C. 154(b) by 672 days.

(21) Appl. No.: 12/428,135

(22) Filed: Apr. 22, 2009

(65) Prior Publication Data

US 2010/0270433 A1      Oct. 28, 2010

(51) Int. Cl.
*B64C 21/00* (2006.01)
(52) U.S. Cl. ..... 244/204; 244/130; 244/200; 244/200.1; 244/201; 244/204.1
(58) Field of Classification Search .......... 244/198, 244/200, 200.1, 201, 203, 204, 204.1, 206, 244/53 B, 130
See application file for complete search history.

(56) References Cited

U.S. PATENT DOCUMENTS

| | | | |
|---|---|---|---|
| 5,133,519 A * | 7/1992 | Falco | 244/200 |
| 6,371,414 B1 | 4/2002 | Truax et al. | |
| 6,427,948 B1 * | 8/2002 | Campbell | 244/204.1 |
| 6,682,021 B1 | 1/2004 | Truax et al. | |
| 2008/0061192 A1 * | 3/2008 | Sullivan | 244/200 |
| 2009/0294596 A1 * | 12/2009 | Sinha et al. | 244/200 |
| 2009/0308980 A1 * | 12/2009 | Miller et al. | 244/207 |

OTHER PUBLICATIONS

J.W. Hamstra, et al., Publication Titled "ICAS-2000-6.11.2, Active Inlet Flow Control Technology Demonstration," presented at 22nd International Congress of the Aeronautical Sciences, in UK, on Aug. 27, 2000.

* cited by examiner

*Primary Examiner* — Timothy D Collins
*Assistant Examiner* — Jamie S Stehle
(74) *Attorney, Agent, or Firm* — Bracewell & Giuliani LLP

(57) ABSTRACT

Systems and methods to provide distributed flow control actuation to manage the behavior of a global flow field, are provided. An example of a system can include an aerodynamic structure having an outer surface, and an array of a plurality of effectors connected to the outer surface of the aerodynamic structure to be in fluid contact with a flowing fluid when operationally flowing, to induce controlled, globally distributed disturbances at a viscous wall sublayer of a turbulent boundary layer of the flowing fluid when operationally flowing and to manipulate fluid behavior of the flowing fluid to thereby substantially reduce pressure loss associated with incipient separation of the fluid flow from portions of the aerodynamic structure.

20 Claims, 11 Drawing Sheets

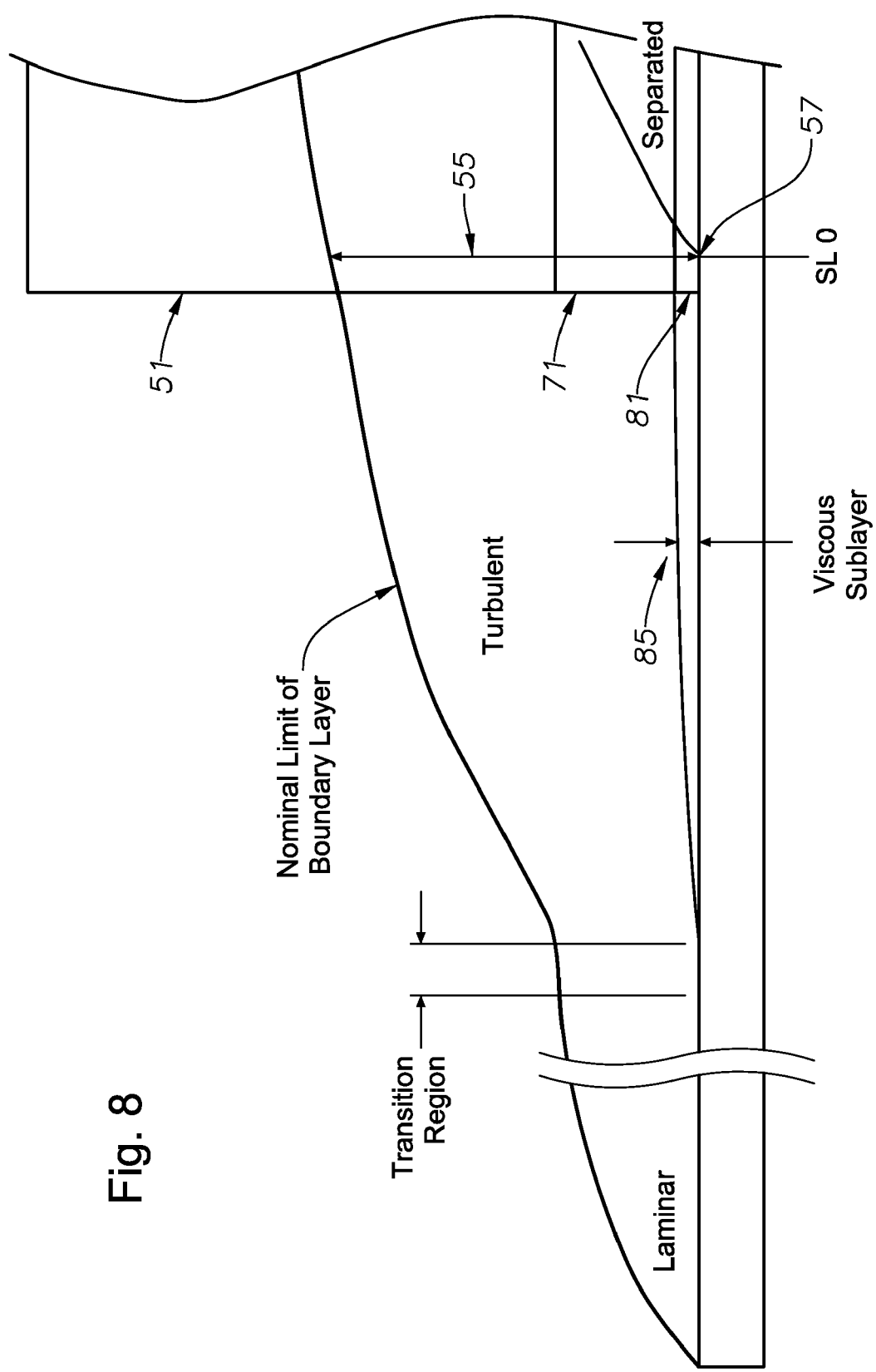

METHOD AND SYSTEM FOR GLOBAL FLOW FIELD MANAGEMENT USING DISTRIBUTED, SURFACE-EMBEDDED, NANO-SCALE BOUNDARY LAYER ACTUATION

BACKGROUND OF THE INVENTION

1. Field of the Invention

The present invention relates generally to manipulating fluid flow over a surface. Particularly, the present invention relates to actively and passively manipulating fluid flow over an aerodynamic or hydrodynamic surface. More specifically, the present invention relates to methods and systems of providing distributed flow control actuation to manage the behavior of a global flow field.

2. Description of the Related Art

Affordability is becoming the dominant design requirement for future tactical aircraft. Affordability must be achieved, however, while simultaneously improving both survivability and aerodynamic performance. To meet vehicle affordability goals, future propulsion systems must be lighter, more compact, and must accommodate ever-increasing integration between the air vehicle, engine, and various subsystems. The engine inlet system shares these goals. Inlet duct design parameters such as the offset, wall curvature rate, shaping, diffusion rate, etc., however, are limited by considerations of pressure loss and flow non-uniformity, i.e., distortion due to turbulence resulting from the shape and wall curvature rate of the of the inlet duct. As future systems evolve toward more compact designs with exotic, survivability-driven shaping, these limitations will in turn limit the design space for the vehicle itself. A need thus continues to exist for new technologies that can overcome these inlet design limitations.

One of the most commonly used methods to control local boundary layer separation within ducted systems is the placement of vortex generators upstream of the layer separation within a natural fluid flow. Vortex generators are small wing like sections mounted on the inside surface of the ducted fluid flow and inclined at an angle to the fluid flow to generate a shed vortex. The height chosen for the best interaction between the boundary layer and the vortex generator has previously been the boundary layer thickness. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent, replace low momentum boundary layer flow. This is a continuous process that provides a source to counter the natural growth of the boundary layer creating adverse pressure gradients and low energy secondary flow accumulation.

Application of such local flow control methods to advanced serpentine inlet ducts, however, has been found to be inadequate in achieving a sufficient reduction of engine face distortion. The "local" use of vortex generators generally only allows separation to be controlled at one flow condition (usually the cruise condition), with all other conditions rendered "off-design." Functional implementations generally include application of a single row of ten or so vortex generators near the point of incipient separation. Although providing an improvement in the amount of total pressure loss, generally on the order of one to two percent maximum, such generators generally result in a minimum parasitic drag of between one-half of one percent to one percent. Further, when implemented in the form of vanes, such sizing generally limits the angle of attack to approximately twelve degrees maximum.

More recent applications, such as those described in U.S. Pat. No. 6,371,414 titled "System and Method for Manipulating and Controlling Fluid Flow over a Surface" and in Hamstra et al. "ICAS-2000-6.11.2 Active Inlet Flow Control Technology Demonstration" presented at the 22nd International Congress of Aeronautical Sciences, 27 Oct.-1 Sep. 2000, Harrogate, United Kingdom, each incorporated by reference in its entirety, have taken a more global approach, utilizing multiple sets of micro-vanes and micro-jets sized down to as low as one-tenth of the thickness of the boundary layer, and positioned near each separate point of incipient separation. Although substantially increasing performance, there nevertheless remains a continuing need to further reduce the maximum total pressure loss and the minimum expected parasitic drag.

Accordingly, the inventors have recognized the need for methods and systems to provide distributed flow control actuation to manage the behavior of a global flow field, which can achieve macroscopic effects by manipulating nanoscopic conditions, and which can provide a substantial reduction in pressure loss and parasitic drag over that of prior systems. Also recognized is the need for a control system in conjunction with a separate multi-dimensional array of nanoscopic actuators positioned at strategic locations with respect to each separate expected point of incipient separation of the flow.

SUMMARY OF THE INVENTION

In view of the foregoing, various embodiments of the present invention advantageously provide methods and systems for providing distributed flow control actuation to manage the behavior of a global flow field, which can achieve macroscopic effects by manipulating nanoscopic conditions, and which can provide a substantial reduction in pressure loss and parasitic drag over that of prior systems. Various embodiments of the present invention advantageously provide a control system in conjunction with a larger array of nanoscopic actuators at strategic locations with respect to each separate expected point of incipient separation of the flow. Various embodiments of the present invention advantageously provide distributed flow control configured to induce controlled, globally distributed disturbances at the level of the viscous wall sublayer of a turbulent boundary layer of the flowing fluid.

More specifically, an example of an embodiment of a system of providing distributed flow control actuation to manage the behavior of a global flow field can include an aerodynamic structure having an outer surface, and an array of a plurality of nano-effectors (e.g., nano-vanes, nano-jets, etc.) connected to the outer surface of the aerodynamic structure to be in fluid contact with a flowing fluid, when operationally flowing, to induce controlled, globally distributed disturbances at a viscous wall sublayer of a turbulent boundary layer of the flowing fluid when operationally flowing and to manipulate fluid behavior of the flowing fluid to thereby substantially reduce pressure loss associated with incipient separation of the fluid flow from portions of the aerodynamic structure. The array of nano-effectors can have a subset positioned adjacent a station line located at an expected point of incipient separation of at least portions of the flowing fluid from the outer surface of the aerodynamic structure, a subset positioned substantially upstream of the expected point of incipient separation, and a subset positioned therebetween to thereby configure the array of the plurality of nano-effectors as a single two-dimensional array. The configuration allows for a total pressure loss due to parasitic drag resulting from the array of the plurality of nano-effectors of less than approximately one-quarter of one percent, with a total RMS turbulence level reduction of approximately between ten percent and thirty percent adjacent a nominal limit of the boundary layer at a location upstream of the expected point of incipient separation of between approximately zero and five times the boundary layer height at the expected point of incipient separation (station line 0 and 5.0 as normalized by boundary layer height), when the fluid flow is operationally flowing at a rate of between approximately mach 0.05 and mach 2.0.

Methods of providing distributed flow control to manage the behavior of a global flow field, are also provided. Such a method can include connecting an array of a plurality of nano-effectors to a surface of an aerodynamic structure to be in fluid contact with a primary fluid flow structure when operationally flowing, and altering a secondary flow structure in a viscous wall sublayer of a turbulent boundary layer of the primary fluid flow structure with the plurality of nano-effectors, to induce controlled, globally distributed disturbances at the viscous wall sublayer of the turbulent boundary layer of the primary flow structure when operationally flowing flow and to manipulate fluid behavior of the primary flow structure to thereby substantially reduce pressure loss associated with the incipient separation of the primary flow structure from portions of the aerodynamic structure. According to such method, the array of nano-effectors can have a subset positioned adjacent a station line located at the expected point of incipient separation of at least portions of the primary flow structure from the surface of the aerodynamic structure, a subset positioned substantially upstream of the expected point of incipient separation, and a subset distributed therebetween to thereby configure the array of the plurality of nano-effectors as a single two-dimensional array.

A method of providing distributed flow control to manage the behavior of a global flow field according to another embodiment of the present invention, can include connecting an array of a plurality of nano-scale effectors to a surface of a structure upstream of a serpentine duct having an inlet extending through the surface of the structure to be in fluid contact with a primary fluid flow structure entering the inlet when operationally flowing to influence performance of the serpentine duct, and altering a secondary flow structure in a viscous wall sublayer of a turbulent boundary layer of the primary fluid flow structure with the plurality of nano-scale effectors to induce controlled disturbances at the viscous wall sublayer of the turbulent boundary layer of the primary flow structure when operationally flowing flow and to manipulate fluid behavior of the primary flow structure. According to such method, the array of the plurality of nano-scale effectors can have a subset positioned adjacent a station line located at the expected point of incipient separation of at least portions of the primary flow structure from the surface of the structure, a subset positioned substantially upstream of the expected point of incipient separation, and a subset positioned therebetween.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 8 provides a relative size scale comparison between vanes, micro-vanes, and nano-vanes, with respect to the boundary layer and the viscous sublayer to illustrate relative nano-vane application to the viscous sublayer according to an embodiment of the present invention;

DETAILED DESCRIPTION

Figure 1:
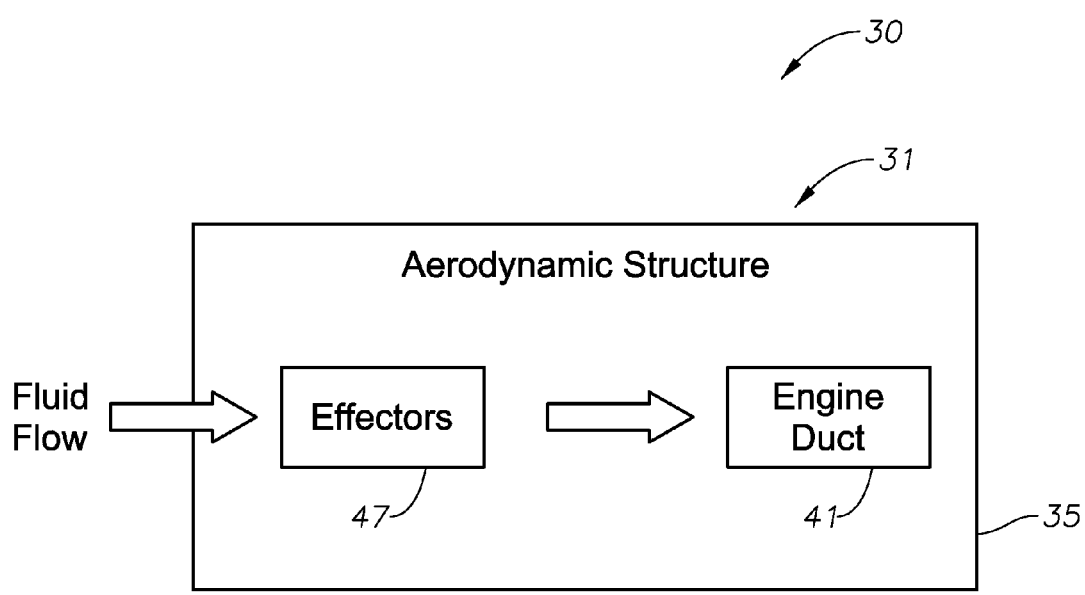
FIG. 1 is a schematic diagram of a general system architecture of a system for providing distributed flow control to manage the behavior of a global flow field according to an embodiment of the present invention.
Figure 2A:
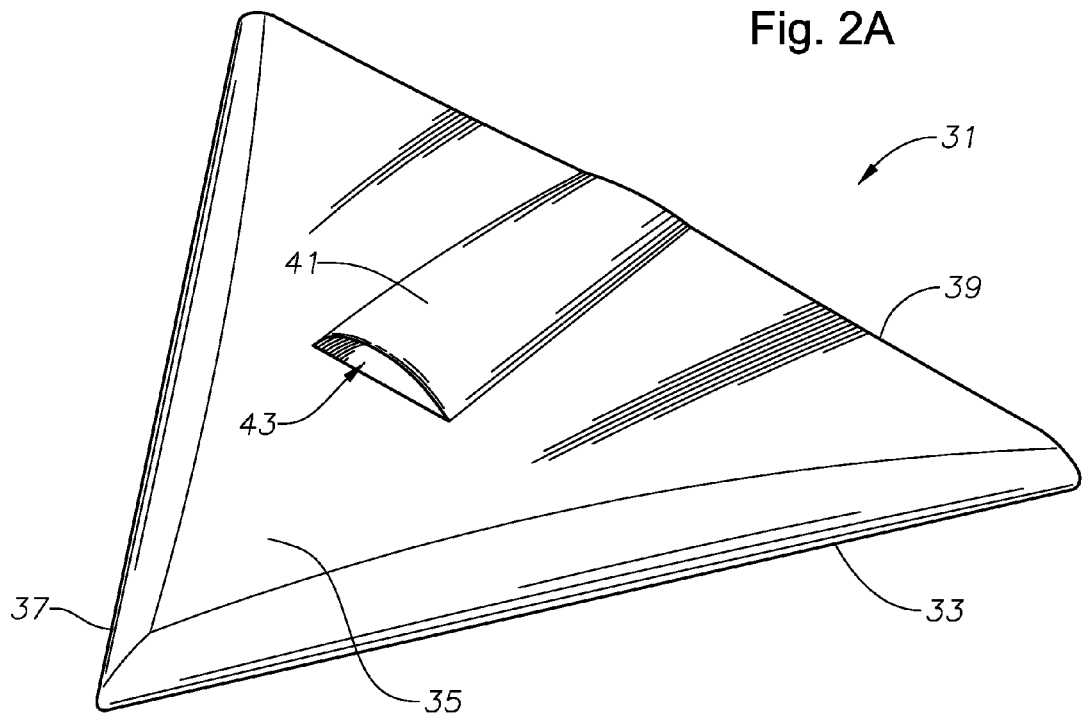
FIGS. 2A-2B provide a perspective view of an aerodynamic structure including a top-mounted engine inlet and a serpentine duct.
Figure 2B:
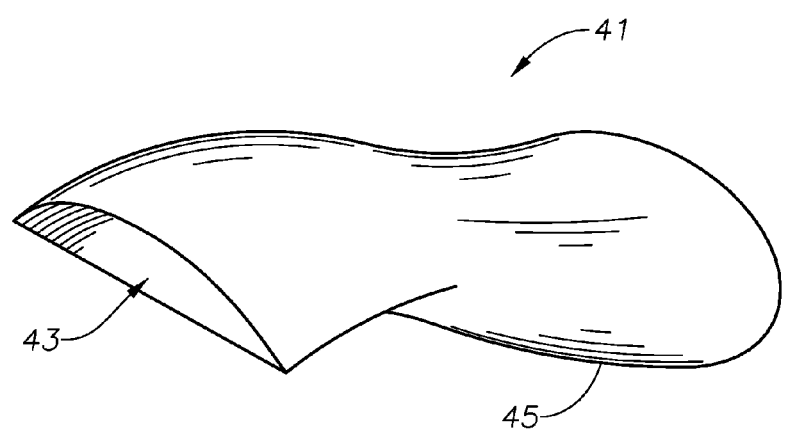

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As shown in FIGS. 1-12, various embodiments of the present invention include a system 30 to provide distributed flow control actuation to manage the behavior of a global flow field, as known to those skilled in the art, associated with an aerodynamic (or hydrodynamic) structure 31 in the form of an air vehicle (see, e.g., FIGS. 2A-2B) including a body 33 having an outer surface 35, shown in the form of an airfoil having a leading edge 37 and a trailing edge 39, and an engine inlet duct 41. The engine inlet duct 41 includes an inlet, e.g., top-mounted inlet 43, and a serpentine duct 45, for example, for guiding inlet air to an engine (not shown).

Figure 3A:
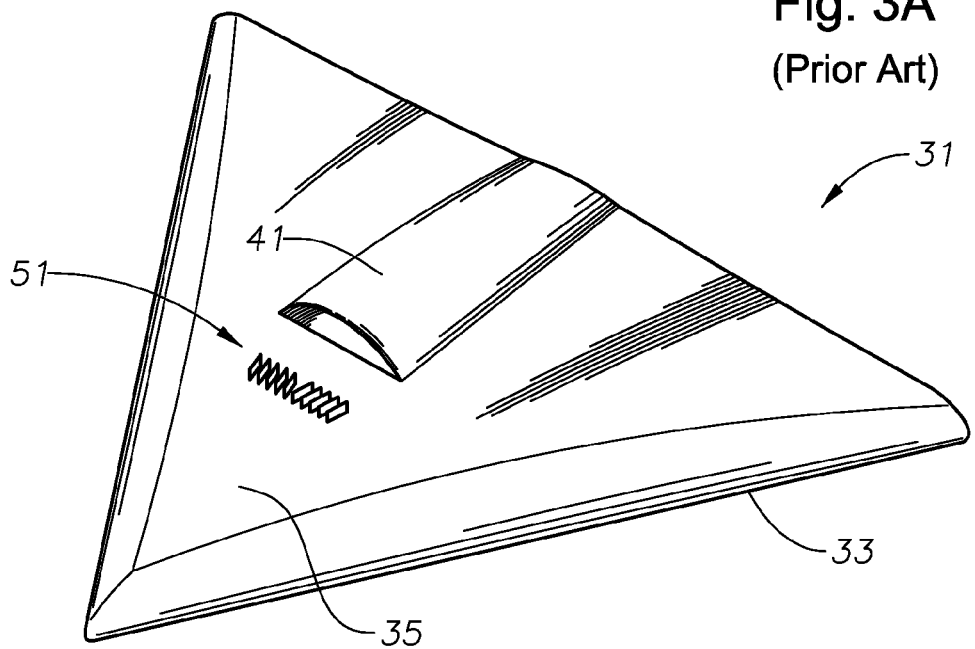
FIGS. 3A-3C provide a perspective view of an aerodynamic structure including passive flow control in the form of a one-dimensional array of large vanes.
Figure 3B:
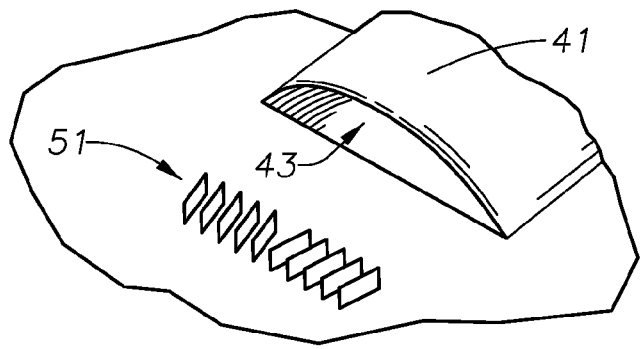
Figure 3C:
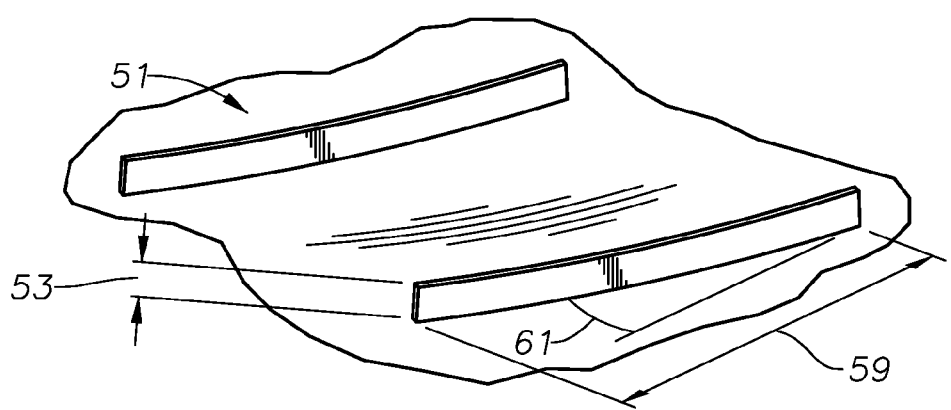

For comparative purposes, FIGS. 3A-3C illustrate application of passive flow control added to the forebody 35 of the aerodynamic structure 31 to influence inlet performance according to a legacy application of large vanes 51. According to a typical implementation, each vane 51 has a height 53 of, for example, between 0.25 and 1.2 times the height 55 (see, e.g. FIG. 8) of the boundary layer thickness at the point of incipient separation 57 of the flowing fluid from the outer surface 35 of the structure 31. The vanes 51 are generally oriented separately in a single row adjacent each expected point of incipient separation 57 of the fluid flow entering the inlet 43. Due to their size, i.e., height 53 and chord length 59, the vanes 51 generally result in a relatively high drag and/or pressure loss of up to one percent and two percent. Accordingly, the vane angle-of-incidence 61 to the expected fluid flow direction generally has a maximum of twelve degrees, resulting in a minimum parasitic drag of between approximately one-half of one percent and one percent.

Figure 4A:
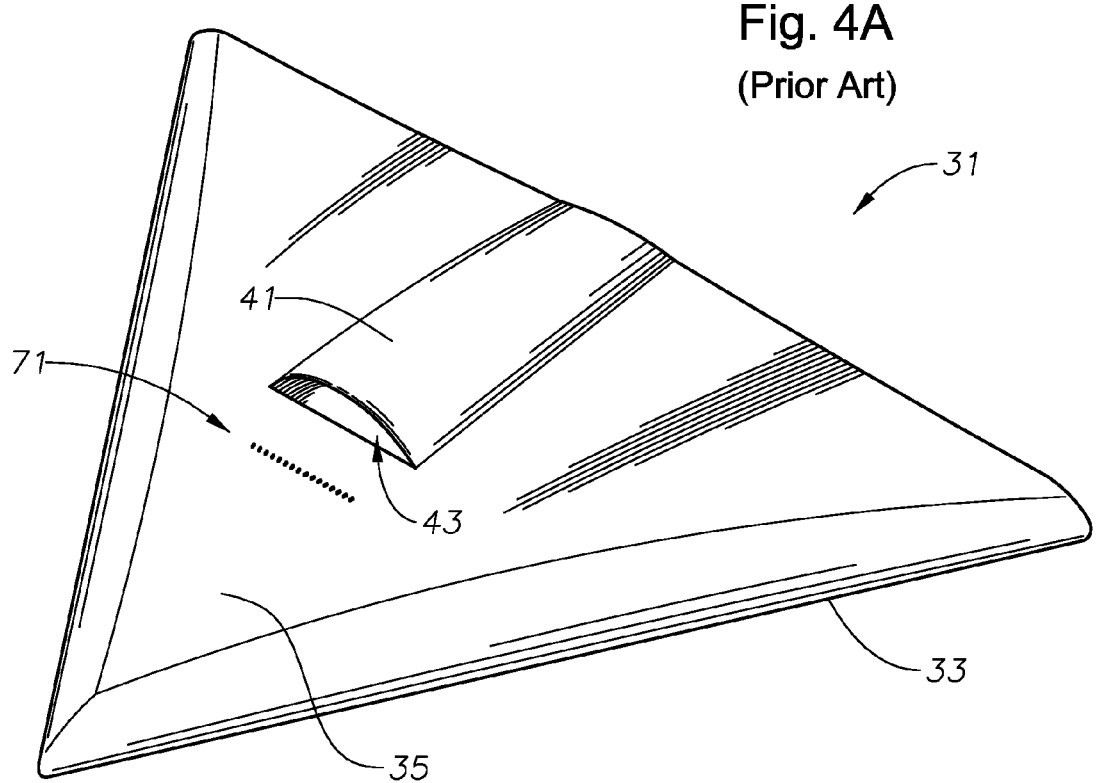
FIGS. 4A-4B provide a perspective view of an aerodynamic structure including passive flow control in the form of a one-dimensional array of micro-vanes.
Figure 4B:
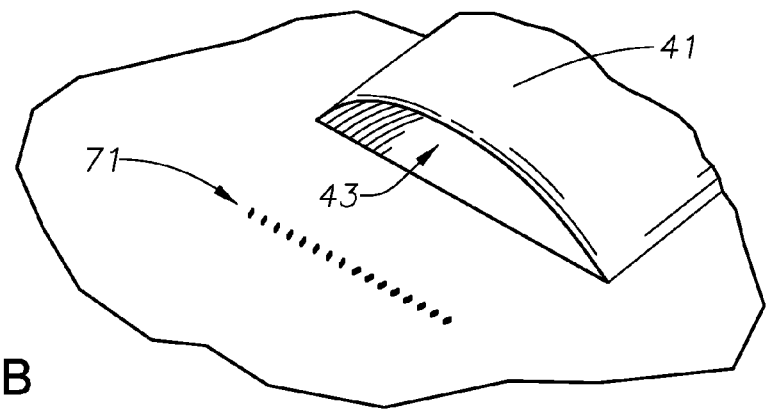

FIGS. 4A-B illustrate a plurality of micro-effectors in the form of a plurality of micro-vanes 71, which, for example, can be deployed in the form of a one-dimensional array to provide enhanced performance over that of the standard large vanes 51, with a corresponding reduction in parasitic drag. To provide such reduction, each micro-vane 71 can have, for example, a height of approximately ten percent to fifty percent of the height 55 of a nominal limit of the boundary layer (e.g., boundary layer thickness) at the expected point of incipient separation 57 upstream of the duct 45.

Figure 5A:
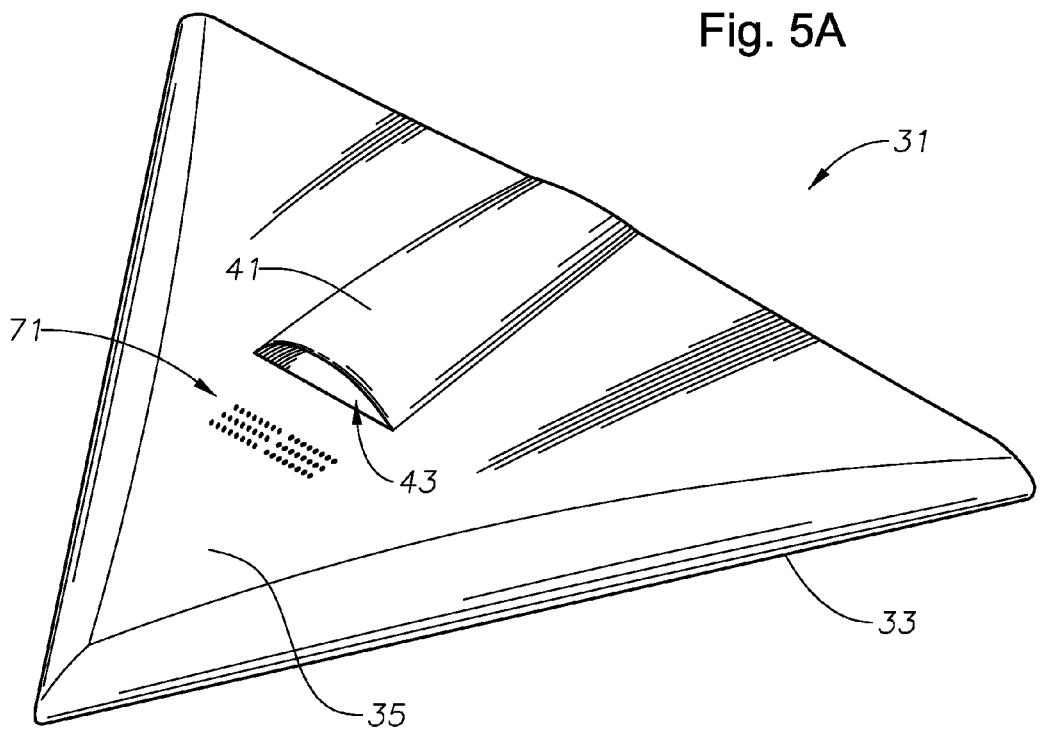
FIGS. 5A-5B provide a perspective view of an aerodynamic structure including passive flow control in the form of a two-dimensional array of nano-vanes according to an embodiment of the present invention.
Figure 5B:
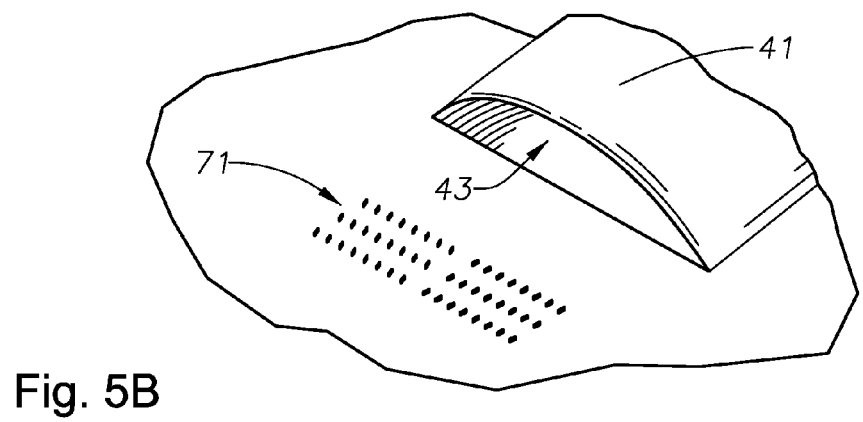

As perhaps best shown in FIGS. 5A-5B, the plurality of micro-vanes 71 can be employed in the form of a two-dimensional array having multiple rows of vanes 71 to provide enhanced performance over that of both the standard large vanes 51 and the one-dimensional array configuration of micro-vanes 71, with a corresponding reduction in parasitic drag. To provide such drag reduction, each micro-vane 71 can have, for example, a height typically in the range of approximately ten percent to fifty percent of the height 55 (FIG. 8) of the boundary layer thickness at the expected point of incipient separation 57 upstream of the duct 45, that is less than would be required if implemented as one-dimensional array of micro-vanes 71. The height of each of the plurality of micro-vanes 71, or more intuitively, the reduction in height can be selected/determined as a function of the number of additional micro-vanes 71 in the two-dimensional array and their spatial positioning and/or orientation, and vice versa.

Note, although the term "rows" is utilized and uniform rows are illustrated in the figures, one of ordinary skill in the art would understand that such terminology does not imply that the "rows" must be perfectly aligned or parallel, but rather, that the distribution of micro-vanes 71 forms an array of microvanes 71, whereby most of the micro-vanes have other micro-vanes 71 positioned at least somewhat laterally adjacent and fore and aft of each other.

FIGS. 6A-6D illustrate a two-dimensional array of nano-effectors 47 (FIG. 1) in the form of a plurality of nano-vanes 81 which can be positioned upstream of the duct 45, and alternatively, or additionally, which can be positioned at each additional separate expected point of incipient separation extending through the duct 45 to provide substantial enhanced performance over that of the standard large vanes 51, and over that of both the one- and two-dimensional arrays of micro-vanes 71.

According to the illustrated configuration, the nano-vanes 81 have a height 53' (see FIG. 6D) of approximately between one percent and eight percent of a height 55 (see FIG. 8) at a nominal limit of an expected boundary layer thickness at the expected point of incipient separation 57, a cord length 59' of approximately between 10% and 100% of boundary layer thickness, and an angle of incidence 61' to the fluid flow under specified operational conditions of approximately between five degrees and thirty-six degrees, and more preferably, between fourteen degrees and thirty-six degrees. According to a preferred configuration, fore and aft spacing 83 between nano-vanes 81 is between approximately two and six times the cord length 59', and the lateral spacing 85 between approximately 0.1 and 1.0 times the cord length 59'.

Note, variations are nevertheless within the scope of the present invention, depending upon the shape of the inlet 43, the shape of the outer surface 35 of the structure 31, the location of the expected point of incipient separation 57, the number of nano-vanes 81, etc. Note also, in a preferred configuration, the nano-vanes 81 can be sized, shaped, positioned/distributed, and oriented to manage fluid flow behavior of a fluid flow characterized by having a baseline uncontrolled condition Reynolds Number for the turbulent boundary layer of between approximately $10^6$ and $10^9$.

Figure 6A:
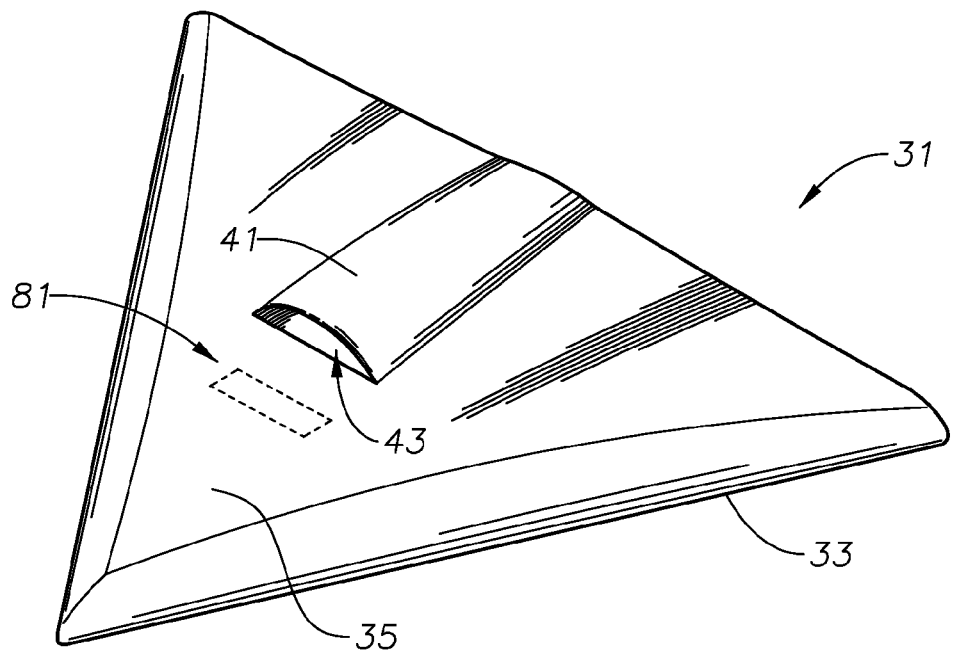
FIGS. 6A-6D provide a perspective view of an aerodynamic structure including passive flow control in the form of an array of nano-vanes according to an embodiment of the present invention.
Figure 6B:
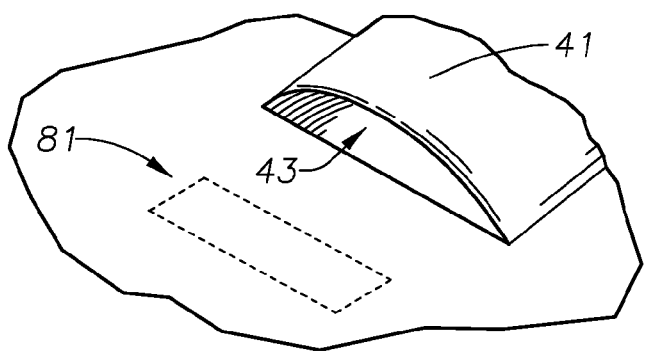
Figure 6C:
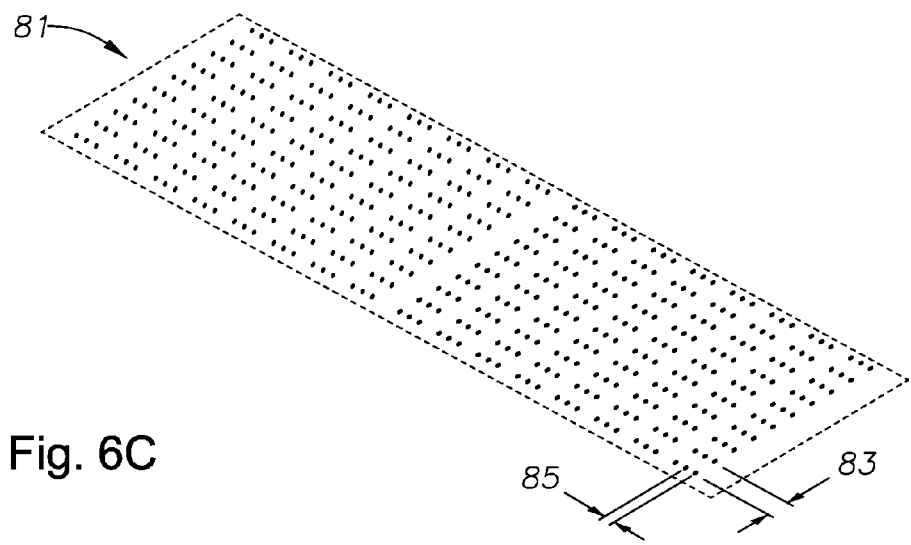
Figure 6D:
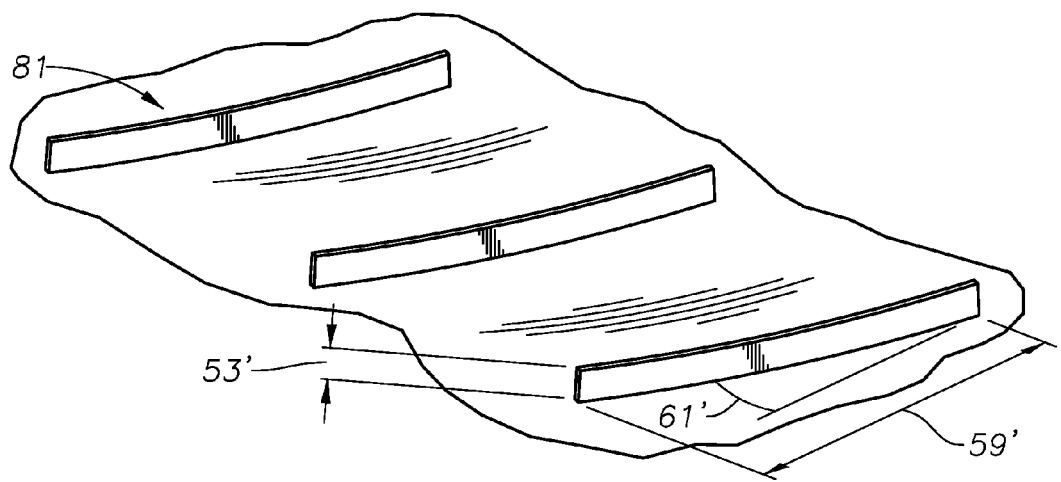

As perhaps best shown in FIG. 6A, the nano-vanes 81 can be operationally connected to the outer surface 35 of the aerodynamic structure 31 to be in fluid contact with a flowing fluid when operationally flowing to induce controlled, globally distributed disturbances at a viscous wall sublayer 85 (see, e.g., FIG. 8) of a turbulent boundary layer of the flowing fluid when operationally flowing, and to manipulate fluid behavior of the flowing fluid. According to the illustrated configuration, the nano-vanes 81 can have a subset positioned adjacent a station line located at the expected point of incipient separation 57 (i.e., station line 0, FIG. 8), a subset positioned substantially upstream of the expected point of incipient separation 57, for example, at a station located approximately five times the distance of the boundary layer height 55 at the expected point of incipient separation 57 (i.e. station line 5.0 as normalized by the boundary layer height 55 at the expected point of incipient separation 57), and the remainder typically substantially evenly distributed therebetween. The array of nano-vanes 81 are further generally positioned to extend laterally a distance of approximately between sixty percent and ninety percent with respect to a width of the inlet 43.

As the expected point of incipient separation 57 can be operably within a range of locations along a longitudinal axis of the aerodynamic structure 31 and dependent upon the flight profile, according to a preferred configuration, the array of nano-vanes 81 can be further distributed such that the array is positioned to extend from a station location adjacent a most downstream location of the expected point of incipient separation 57 of at least portions of the flowing fluid from the outer surface 35 of the aerodynamic structure 31, and a station location substantially upstream of a most upstream location of the expected point of incipient separation 57. That is, according to this configuration, the most proximal station line (i.e., station line 0) should be at least as forward as the most downstream location of the expected point of incipient separation 57, and the most distal station line (e.g., station line 5.0) should be at least upstream, but preferably substantially upstream, of the most upstream location of the expected point of incipient separation 57.

Beneficially, such configurations can substantially reduce pressure loss associated with incipient separation of the fluid flow from portions of the aerodynamic structure 31, and parasitic drag associated with the nano-vanes 81. For example, according to the illustrated configuration, the total pressure loss due to parasitic drag resulting from the array of the plurality of nano-vanes 81 can beneficially be less than approximately one-quarter of one percent, with a total RMS turbulence level reduction of approximately between ten percent and thirty percent adjacent a nominal limit of the boundary layer at a station location upstream of the expected point of incipient separation 57, for example, of between approximately station line 0 and station line 5.0 as normalized by boundary layer height 55 at the expected point of incipient separation 57, when a fluid flow is operationally flowing at a rate of between approximately mach 0.05 and mach 2.0.

Figure 7A:
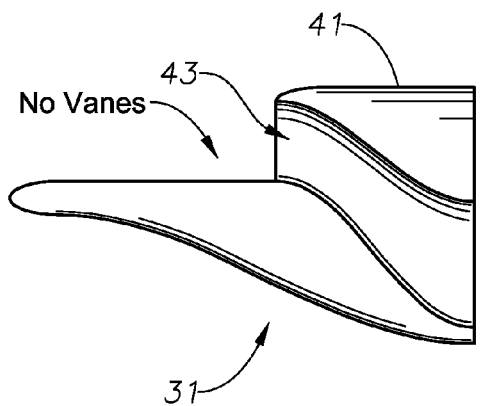
FIGS. 7A-7C provide a relative scale comparison of the application of vanes, micro-vanes, and nano-vanes according to an embodiment of the present invention.
Figure 7B:
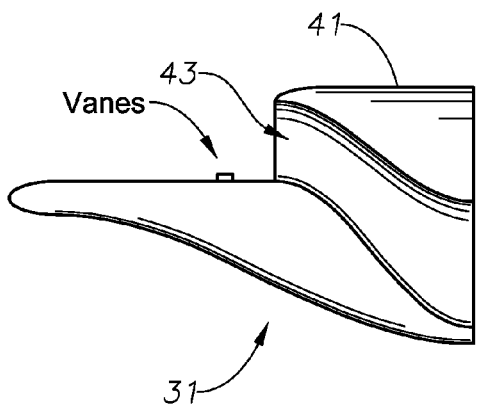
Figure 7C:
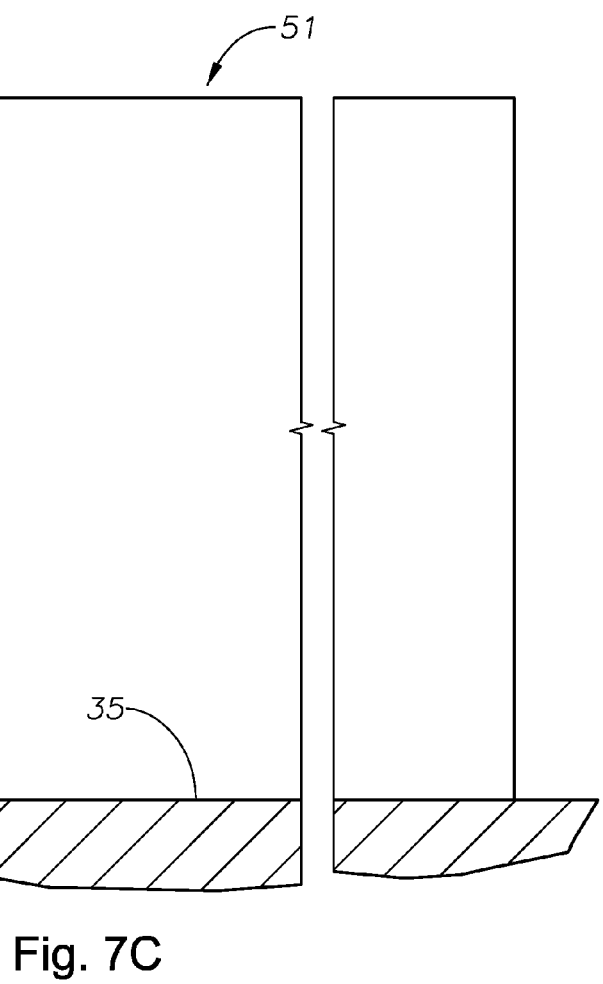

FIGS. 7A-7C provide a relative size comparison between vanes 51, micro-vanes 71, and nano-vanes 81, and FIG. 8 provides a relative size scale comparison between the vanes 51, micro-vanes 71, and nano-vanes 81, with respect to the boundary layer (characterized by high turbulence, large vortices, and high momentum) and the viscous sublayer (characterized by low turbulence, small concentrated vortices, and low momentum) to illustrate nano-vane application to the viscous sublayer, which can provide a surprising reduction in pressure loss with a substantial reduction in parasitic drag over that of both the vanes 51 and the micro-vanes 71, as described above.

Figure 9:
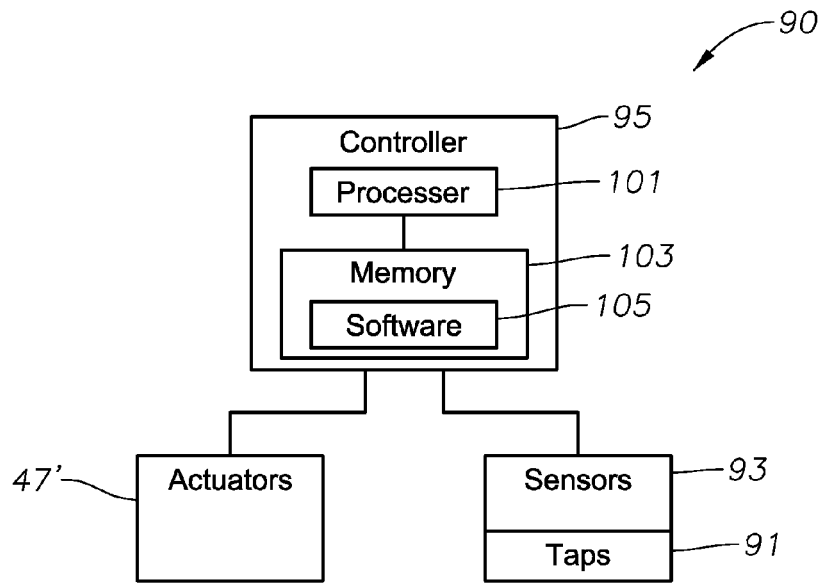
FIG. 9 is a schematic block diagram of a control and feedback system to provide active flow control according to an embodiment of the present invention.
Figure 10:
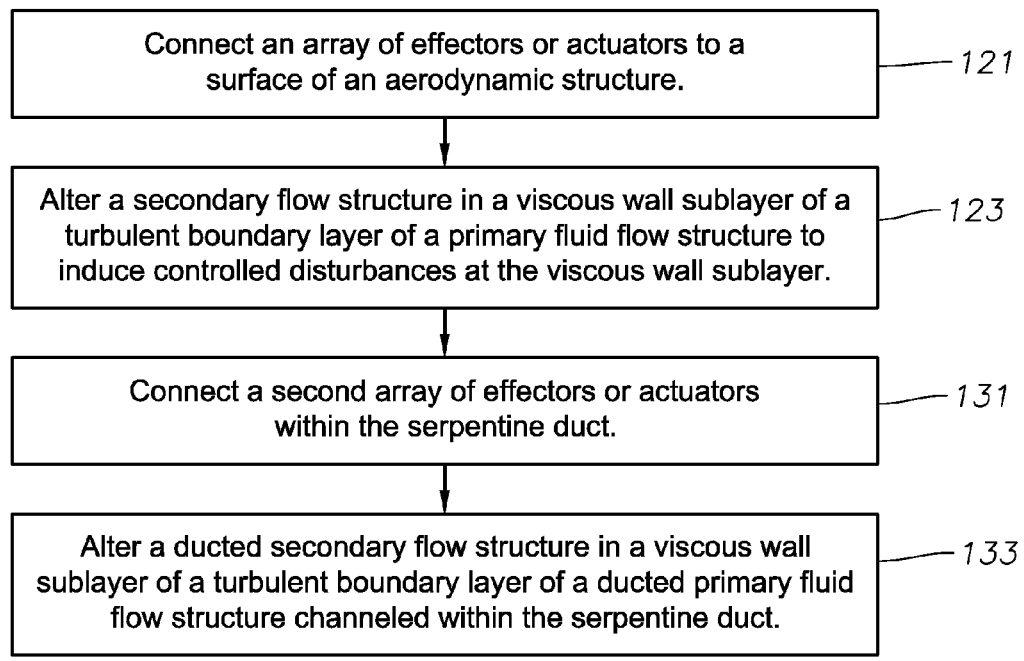
FIG. 10 is a schematic flow diagram of a method for providing distributed flow control to manage the behavior of a global flow field according to an embodiment of the present invention.

FIG. 9 illustrates a control and feedback system 90 to provide active flow control according to an example of an embodiment of the present invention. Although the various embodiments of the present invention have been illustrated in the form of nano-vanes 81, the nano-effectors 47 identified in FIG. 1, can be in the form of active nano-sized effectors or actuators (e.g., nano-actuators 47') including nano-jet actuators, for example, having a diameter of approximately between one percent and five percent. As such, the system 30 can include a control and feedback system 90 including a plurality of static pressure taps 91 at least positioned adjacent station line 0, but preferably distributed amongst the array of nano-actuators 47' to receive static pressure within the array, and can include a corresponding plurality of pressure sensors 93 as known to those skilled in the art, each in fluid communication with at least one of the pressure taps 91.

According to an embodiment of the control system 90, the sensors 93 can be wireless sensors distributed along the outer surface 35, receiving power from the environment via energy harvesting or from a transceiver (not shown) interfaced with a controller 95. According to another embodiment of the control system 90, the sensors 93 can be connected via optical fiber or electrical wire embedded in the aerodynamic structure 31. Note, in the wireless or wireline configuration having the pressure sensing portion of the sensors 93 located below the surface 35 of the structure 31, the pressure taps 91 can take the form of a recess or tunnel (not shown). In a wireless or wireline configuration having the pressure sensing portion of the sensors 93 exposed to the surface 35 of the structure 31, the pressure taps 91 take the form of the surface exposure between the sensing portion of the sensors 93 and the fluid flow.

Note further, an embodiment of the nano-actuators 47' and/or pressure sensors 93 can be in the form of Nano-fabricated Electro-Mechanical Systems (NEMS). NEMS is a fabrication approach that conveys the advantages of miniaturization, multiple components and nano-electronics to the design and construction of integrated electro-mechanical systems. NEMS offers the integration of nano-machined mechanical devices and nano-electronics. Mechanical components in NEMS, like transistors in nano-electronics, have dimensions that are measured in nanometers. These electro-mechanical devices may include discrete effectors and sensors. NEMS is an improvement over Micro-fabricated Electro-Mechanical Systems (MEMS), functioning at the nano-level, which, due to their size, can be employed in extremely thin services such as paints or coatings, along with more conventional locations such as, for example, within a sheet of laminate or in the bonding material.

The controller 95 (see, e.g., FIG. 9) can be operably wirelessly coupled or coupled via wire/optical line connection to each of the pressure sensors 93 and to each of the nano-actuators 47', and can be configured to determine the static pressure within the array in response to signals received from the pressure sensors 93 and to automatically and continuously control the mass flow of at least a subset of the nano-actuators 47' responsive to the determined static pressure or pressures. The controller 95 can also be configured to automatically and continuously determine a station location of the expected point of incipient separation 57 responsive to the determined static pressure and responsive to the determined location of the expected point of incipient separation 57, to automatically and continuously control the mass flow of at least a subset of the nano-actuators 47'. The controller 95 can correspondingly include a processor 101, memory 103 operably coupled to the processor 101, and firmware, program product, or other software 105 stored in the memory 103 for providing such functions.

According to a configuration, the nano-effectors 47, nano-actuators 47', and/or sensors 93, can be embedded within or connected to a paint or coating positioned on the outer surface 35 of the aerodynamic structure 31, an adhesive positioned adjacent the outer surface 35 of the aerodynamic structure 31, a sheet of laminate material bonded, and/or co-bonded to the aerodynamic structure 31 to at least partially form the outer surface 35. Further, due to their size, the nano-effectors 47, nano-actuators 47', and/or sensors 93, can be positioned in locations not previously deemed capable, such as, for example, a leading edge 37 of a lift producing surface of the structure 31; a trailing edge 39 of a lift producing surface of the structure 31, or other substantially curved surface. Note, application to highly curved surfaces was not previously feasible due to the size of the prior effectors and/or drag concerns.

Various embodiments of the present invention also include methods of providing distributed flow control actuation to manage the behavior of a global flow field. As perhaps best shown in FIG. 10, such a method can include the steps of connecting an array of a plurality of nano-effectors 47 to a surface of an aerodynamic structure 31 to be in fluid contact with a primary fluid flow structure when operationally flowing (block 121), and altering a secondary flow structure in a viscous wall sublayer 85 of a turbulent boundary layer of the primary fluid flow structure (block 123) to manipulate fluid behavior of the primary flow structure to thereby substantially reduce pressure loss associated with the incipient separation of the primary flow structure from portions of the aerodynamic structure 31. The altering of the secondary flow structure can beneficially result in an inducement of controlled, globally distributed disturbances at the viscous wall sublayer of the turbulent boundary layer of the primary flow structure when operationally flowing flow.

According to an exemplary configuration of the array of a plurality of nano-effectors 47 employed by the method, the nano-effectors 47 can be positioned upstream of an inlet 43 connected to a serpentine duct body 45 extending into the aerodynamic structure 31 such that the array of nano-effectors 47 have a subset positioned adjacent a station line located at an expected point of incipient separation 57 of at least portions of the primary flow structure from the surface 35 of the aerodynamic structure 31 (e.g., station line 0), a subset longitudinally positioned substantially upstream of the expected point of incipient separation 57 (e.g., station line 5.0), and a subset distributed longitudinally therebetween, and laterally distributed a distance of approximately between sixty percent and ninety percent with respect to a width of the inlet 43, to configure the array of the plurality of nano-effectors 47 as a single array.

The employed nano-effectors 47 can include a plurality of nano-vanes 81 having a height 53 of approximately between one percent and five percent of a height 55 at a nominal limit of an expected boundary layer thickness at the expected point of incipient separation 57, and can be oriented at an angle of incidence 61 to the primary flow structure of between approximately at least five degrees and thirty-six degrees, but preferably between approximately thirteen degrees and thirty-six degrees, for example. Alternatively, the nano-effectors 47 can be in the form of nano-jet actuators 47' each having a diameter, for example, of between approximately one percent and five percent of the height 55 at a nominal limit of an expected boundary layer thickness at the expected point of incipient separation 57.

Beneficially, according to the above nano-scale configurations, the total pressure loss due to parasitic drag when applied to an operationally flowing fluid flow, for example, having a baseline uncontrolled condition Reynolds Number for the turbulent boundary layer of between approximately $10^6$ and $10^9$, can be less than approximately one quarter of one percent, with a total RMS turbulence level reduction adjacent a nominal limit of the boundary layer of approximately between ten percent and fifty percent at a location upstream of the expected point of incipient separation 57 of between approximately station line 0 and station line 5.0, to a location as far forward as station line 20, with station line 5.0 being defined as a position forward a station line 0 having a distance equivalent to five times the boundary layer height at the expected point of incipient separation 57, when the fluid flow is operationally flowing at a rate of between approximately mach 0.05 and mach 2.0.

According to an embodiment of the method, the step of connecting shown at block 121 can include performing one or more of the following steps: embedding at least a subset of the plurality of nano-effectors 47 and/or nano-actuators 47' in a paint or coating positioned on the outer surface 35 of the aerodynamic structure 31; embedding at least a subset of the plurality of nano-effectors 47 and/or nano-actuators 47' in a sheet of laminate material bonded or co-bonded to the aerodynamic structure 31 to at least partially form the outer surface 35; and/or embedding at least a subset of the plurality of nano-effectors 47 and/or nano-actuators 47' in an adhesive positioned adjacent the outer surface 35 of the aerodynamic structure 31.

According to an embodiment of the method, the step of connecting, shown at block 121, can also, or alternatively, include performing one or more of the following steps: connecting at least a subset of the plurality of nano-effectors 47 and/or nano-actuators 47' to a leading edge 37 of a lift producing surface of the aerodynamic structure 31; and/or connecting at least a subset of the plurality of nano-effectors 47 and/or nano-actuators 47' to a trailing edge 39 of a lift producing surface of the aerodynamic structure 31.

The method can also include connecting a second array of a second plurality of nano-effectors 47 within the serpentine duct (block 131), and altering a ducted secondary flow structure in a viscous wall sublayer of a turbulent boundary layer of a ducted primary fluid flow structure channeled within the serpentine duct (block 133).

Figure 11:
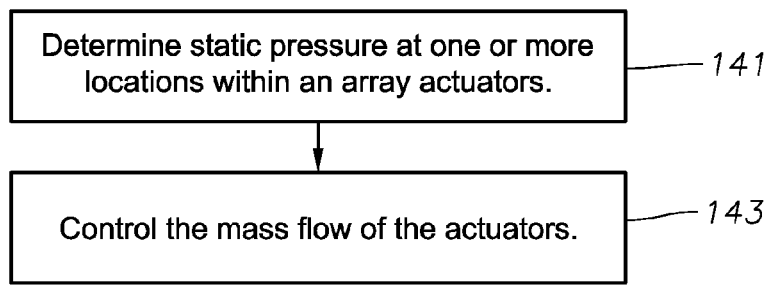
FIG. 11 is a schematic flow diagram illustrating steps associated with the step of altering a secondary flow structure according to an embodiment of the present invention.

Referring to FIG. 11, when employing nano-effectors 47 in the form of active nano-effectors or nano-actuators 47', the step/steps of altering a secondary flow structure can include the steps of detecting or otherwise determining static pressure (block 141) at least one location within the array nano-actuators 47', but more typically, along a plurality of separate and spaced apart longitudinal locations within the array of nano-actuators 47'; and controlling the mass flow of the nano-actuators 47' responsive to the determined static pressure (block 143).

Figure 12:
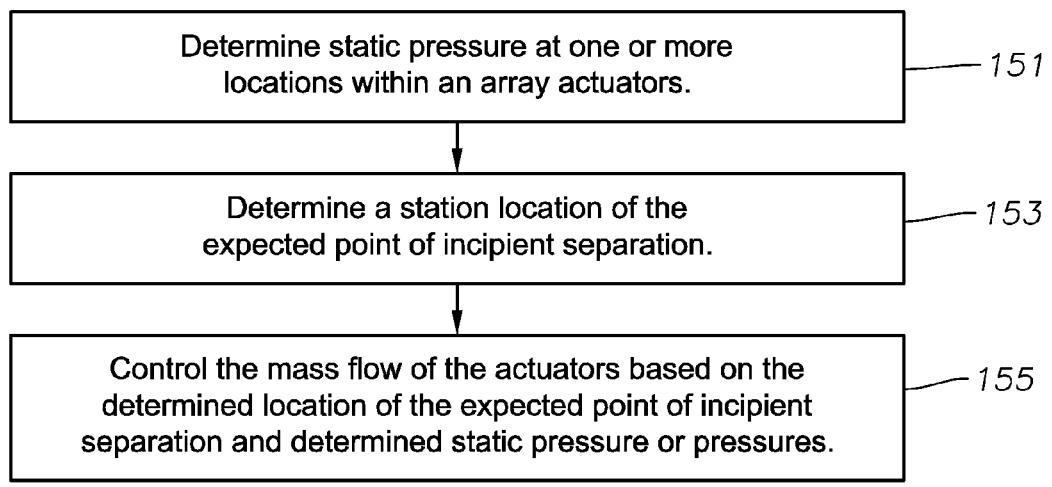
FIG. 12 is a schematic flow diagram illustrating steps associated with the step of altering a secondary flow structure according to another embodiment of the present invention.

Referring to FIG. 12, when employing nano-effectors 47 in the form of active nano-effectors or nano-actuators 47', the step of altering a secondary flow structure can alternatively include the steps of detecting or otherwise determining static pressure (block 151) at least one location within the array, but more typically, along a plurality of separate and spaced apart longitudinal locations within the array of nano-actuators 47'; determining a station location of the expected point of incipient separation 57 (e.g., station line 0) responsive to the detected static pressure, e.g., when the expected point of incipient separation 57 is operably within a range of locations along a longitudinal axis of the aerodynamic structure 31 (block 153); and separately controlling the mass flow of at least one, but more typically, a plurality of nano-actuators 47' or a plurality of subsets of the plurality of nano-actuators 47' (block 155) responsive to the determined location of the expected point of incipient separation and responsive to the determined static pressure or pressures.

It is important to note that while embodiments of the present invention associated with the employment of active flow control have been described in the context of a fully functional system, those skilled in the art will appreciate that the mechanism of at least portions of such implementation and/or aspects thereof are capable of being distributed in the form of a computer readable medium of instructions in a variety of forms for execution on a processor, processors, or the like, and that embodiments of the present invention apply equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and certain types of transmission type media such as, for example, digital and analog communication links capable of storing the set of instructions. Such media, for example, can include both operating instructions and operations instructions related to the controller 95, software 105, and the method steps/operations associated with active flow control, described above.

Various embodiments in the present invention provide several advantages. For example, by concentrating the physical effect at the viscous sublayer, as opposed to areas experiencing a higher momentum, various embodiments of the present invention can provide the required pressure loss reduction while providing a significant drag and turbulence level reduction, and thus, a substantial increase in aerodynamic performance. Various embodiments of the present invention substantially illuminate drag due to the nano-effectors 47 and/or nano-actuators 47', while substantially reducing total pressure loss to below one quarter of one percent, and due to their drag profile, allow much higher angles of incidence 61. Further, due to their nano scale, the nano-effectors 47/nano-actuators 47', can be operationally deployed in a sheet of laminate and/or in its bonding material, or in a surface paint or coating.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A method of providing distributed flow control to manage the behavior of a global flow field, the method comprising the steps of:
   connecting an array of a plurality of nano-effectors to a surface of an aerodynamic structure to be in fluid contact with a primary fluid flow structure when operationally flowing, the array of nano-effectors having a subset positioned adjacent a station line located at an expected point of incipient separation from the surface of the aerodynamic structure of at least portions of the primary flow structure, a subset positioned substantially upstream of the expected point of incipient separation, and a subset distributed therebetween to thereby configure the array of the plurality of nano-effectors as a single two-dimensional array; and
   altering a secondary flow structure in a viscous wall sublayer of a turbulent boundary layer of the primary fluid flow structure with the plurality of nano-effectors to induce controlled, globally distributed disturbances at the viscous wall sublayer of the turbulent boundary layer of the primary flow structure when operationally flowing flow and to manipulate fluid behavior of the primary flow structure to thereby substantially reduce pressure loss associated with the incipient separation of the primary flow structure from portions of the aerodynamic structure.

2. A method as defined in claim 1, wherein the plurality of nano-effectors are sized and spatially oriented to substantially concentrate direct physical effects of the plurality of nano-effectors at the viscous sublayer and to substantially minimize direct physical effects at fluid flow levels experiencing a substantially higher momentum than that experienced at the viscous sublayer.

3. A method as defined in claim 2, wherein total pressure loss due to parasitic drag resulting from the steps of connecting and altering is less than approximately 1/4%, with a total RMS turbulence level reduction of approximately between 10% and 50% adjacent a nominal limit of the boundary layer at a station distance upstream of the expected point of incipient separation of between approximately 0 and 5.0 as normalized by boundary layer height at the expected point of incipient separation, when the fluid flow is operationally flowing at a rate of between approximately mach 0.05 and mach 2.0.

4. A method as defined in claim 2,
   wherein a baseline uncontrolled condition Reynolds Number for the turbulent boundary layer is between approximately $10^6$ and $10^9$ when the fluid flow is operationally flowing;
   wherein the plurality of nano-effectors include a plurality of nano-vanes having a height of approximately between 1% and 5% of a height at a nominal limit of an expected boundary layer thickness at the expected point of incipient separation and positioned at a station distance upstream of the expected point of incipient separation of between approximately 0.0 and 5.0, the station distance normalized by boundary layer thickness; and
   wherein the step of connecting includes the step of orienting each of the nano-vanes at an angle of incidence to the primary flow structure of between approximately 13 degrees and 36 degrees.

5. A method as defined in claim 1, wherein the step of connecting includes the steps of:
   positioning at least substantial portions of the array of the plurality of nano-effectors upstream of an inlet connected to a serpentine duct extending into the aerodynamic structure; and
   positioning the array of nano-effectors laterally a distance of approximately between 60% and 90% with respect to a width of the inlet.

6. A method as defined in claim 1, wherein the array of a plurality of the nano-effectors is a first array of a first plurality of nano-effectors, and wherein the method further comprises the steps of:
   positioning at least substantial portions of the first array of the first plurality of nano-effectors upstream of an inlet connected to a serpentine duct extending into the aerodynamic structure;
   connecting a second array of a second plurality of nano-effectors within the serpentine duct; and
   altering a ducted secondary flow structure in a viscous wall sublayer of a turbulent boundary layer of a ducted primary fluid flow structure channeled within the serpentine duct.

7. A method as defined in claim 1,
   wherein the plurality of nano-effectors are nano-jet actuators having a diameter of approximately between 1% and 5% of boundary layer height at a nominal limit of the boundary layer at the expected point of incipient separation; and
   wherein the step of altering a secondary flow structure includes the steps of:
      determining static pressure at one or more locations within the array,
      controlling the mass flow of the plurality of nano-jet actuators responsive to the determined static pressure.

8. A method as defined in claim 1,
   wherein the plurality of nano-effectors include a plurality of nano-jet actuators;
   wherein the expected point of incipient separation is operably within a range of locations along a longitudinal axis of the aerodynamic structure;
   wherein the step of connecting includes positioning the array of the plurality of nano-jet actuators to extend from a station location adjacent a most downstream location of the expected point of incipient separation and a station location substantially upstream of a most upstream location of the expected point of incipient separation; and
   wherein the step of altering a secondary flow structure includes the steps of:
      detecting static pressure along a plurality of separate and spaced apart longitudinal locations within the array,
      determining a station location of the expected point of incipient separation responsive to the detected static pressure, and
      separately controlling the mass flow of at least a subset of the plurality of nano-jet actuators responsive to the determined location of the expected point of incipient separation and responsive to the determined static pressure or pressures.

9. A method as defined in claim 1, wherein the step of connecting includes performing one or more of the following steps:
- embedding at least a subset of the plurality of nano-effectors in a paint or coating positioned on the outer surface of the aerodynamic structure;
- embedding at least a subset of the plurality of nano-effectors in a sheet of laminate material bonded or co-bonded to the aerodynamic structure to at least partially form the outer surface; and
- embedding at least a subset of the plurality of nano-effectors in an adhesive positioned adjacent the outer surface of the aerodynamic structure.

10. A method of providing distributed flow control to manage the behavior of a global flow field, the method comprising the steps of:
- connecting an array of a plurality of nano-scale effectors to a surface of a structure upstream of a serpentine duct having an inlet extending through the surface of the structure to be in fluid contact with a primary fluid flow structure entering the inlet when operationally flowing to influence performance of the serpentine duct, the array of the plurality of nano-scale effectors having a subset positioned adjacent a station line located at an expected point of incipient separation from the surface of the structure of at least portions of the primary flow structure, a subset positioned substantially upstream of the expected point of incipient separation, and a subset positioned therebetween; and
- altering a secondary flow structure in a viscous wall sublayer of a turbulent boundary layer of the primary fluid flow structure with the plurality of nano-scale effectors to induce controlled disturbances at the viscous wall sublayer of the turbulent boundary layer of the primary flow structure when operationally flowing flow and to manipulate fluid behavior of the primary flow structure.

11. A method as defined in claim 10, wherein total pressure loss due to parasitic drag resulting from the steps of connecting and altering is less than approximately ¼%, with a total RMS turbulence level reduction of approximately between 10% and 50% adjacent a nominal limit of the boundary layer at a station line upstream of the expected point of incipient separation of between approximately 0 and 5.0 as normalized by boundary layer height at the expected point of incipient separation, when the fluid flow is operationally flowing at a rate of between approximately mach 0.1 and mach 2.0.

12. A method as defined in claim 11, wherein the plurality of nano-scale effectors include a plurality of nano-vanes having a height of approximately between 1% and 5% of an expected boundary layer thickness at the expected point of incipient separation and positioned at a station distance upstream of the expected point of incipient separation of between approximately 0.0 and 5.0, the station distance normalized by boundary layer thickness.

13. A method as defined in claim 12, wherein the step of connecting includes the step of orienting each of the nano-vanes at an angle of incidence to the primary flow structure of approximately between 13 degrees and 36 degrees.

14. A method as defined in claim 11, wherein the plurality of nano-scale effectors include a plurality of nano-jet actuators, and wherein the step of altering a secondary flow structure includes the steps of:
- detecting static pressure along a plurality of separate and spaced apart longitudinal locations within the array,
- determining a station location of the expected point of incipient separation responsive to the detected static pressure, and
- separately controlling the mass flow of at least a subset of the plurality of nano-jet actuators responsive to the determined location of the expected point of incipient separation and responsive to the determined static pressure or pressures.

15. A method as defined in claim 1,
wherein a baseline uncontrolled condition Reynolds Number for the turbulent boundary layer is between approximately $10^6$ and $10^9$ when the fluid flow is operationally flowing.

16. A method as defined in claim 15, wherein the plurality of nano-effectors include a plurality of nano-vanes having a height of approximately between 1% and 5% of a height at a nominal limit of an expected boundary layer thickness at the expected point of incipient separation and positioned at a station distance upstream of the expected point of incipient separation of between approximately 0.0 and 5.0, the station distance normalized by boundary layer thickness.

17. A method as defined in claim 16, wherein the step of connecting includes the step of:
- orienting each of the nano-vanes at an angle of incidence to the primary flow structure of between approximately 13 degrees and 36 degrees.

18. A method as defined in claim 1,
wherein each of the plurality of nano-effectors has:
- a height of approximately between 1% and 8% of a height at a nominal limit of an expected boundary layer thickness at the expected point of incipient separation;
- a chord length of approximately between 10% and 100% of boundary layer thickness; and
- an angle of incidence to the fluid flow of approximately between 14 and 36 degrees.

19. A method as defined in claim 1,
wherein the aerodynamic structure includes a ducted inlet having a serpentine configuration.

20. A method as defined in claim 19, wherein the step of connecting an array of a plurality of nano-effectors to a surface of an aerodynamic structure includes the steps of:
- positioning at least substantial portions of the array of the plurality of nano-effectors upstream of the ducted inlet; and
- positioning the array of the plurality of nano-effectors laterally a distance of approximately between 60% and 90% with respect to a width of the inlet.

* * * * *